(12) United States Patent
Vogl et al.

(10) Patent No.: US 8,312,599 B2
(45) Date of Patent: Nov. 20, 2012

(54) APPARATUS FOR RETAINING BAGS FOR CARRYING PET DROPPINGS

(76) Inventors: Nicole Vogl, Alexandria, VA (US); Michael J. Vogl, Alexandria, VA (US)

( * ) Notice: Subject to any disclaimer, the term of this patent is extended or adjusted under 35 U.S.C. 154(b) by 675 days.

(21) Appl. No.: 11/873,774

(22) Filed: Oct. 17, 2007

(65) Prior Publication Data
US 2009/0101071 A1  Apr. 23, 2009

(51) Int. Cl.
*A01K 29/00* (2006.01)
*A01K 23/00* (2006.01)

(52) U.S. Cl. ............ 24/3.12; 24/30.5 R; 24/132 R; 24/132 AA

(58) Field of Classification Search .......... 24/30.5 R, 24/132 R, 132 AA, 30.5 S, 3.12; 297/452.26; 248/101; D30/153
See application file for complete search history.

(56) References Cited

U.S. PATENT DOCUMENTS

| | | | |
|---|---|---|---|
| 596,150 A * | 12/1897 | Fitch | 24/30.5 S |
| 911,460 A * | 2/1909 | Tiley | 104/217 |
| 2,493,063 A * | 1/1950 | Frank et al. | 383/71 |
| 4,890,741 A * | 1/1990 | Edelstein | 206/534 |
| 5,233,942 A * | 8/1993 | Cooper et al. | 119/792 |
| 5,363,809 A | 11/1994 | Roe | |
| 5,441,017 A * | 8/1995 | Lindsay | 119/795 |
| 5,560,321 A * | 10/1996 | Hess | 119/858 |
| 5,680,978 A * | 10/1997 | Pinion | 225/106 |
| 5,718,192 A * | 2/1998 | Sebastian | 119/795 |
| D393,504 S | 4/1998 | Eisman | |
| 5,890,456 A | 4/1999 | Tancrede | |
| 5,890,637 A * | 4/1999 | Furneaux | 224/191 |
| 6,076,717 A * | 6/2000 | Edwards et al. | 225/6 |
| 6,086,123 A | 7/2000 | Sowinski et al. | |
| 6,129,096 A | 10/2000 | Johnson | |
| 6,199,737 B1 | 3/2001 | Ringelstetter | |
| 6,237,533 B1 | 5/2001 | Rodriguez | |
| 6,257,473 B1 | 7/2001 | Ringelstetter | |
| 6,454,119 B1 | 9/2002 | Demeur et al. | |
| 6,571,745 B2 | 6/2003 | Kerrigan | |
| 6,578,730 B2 | 6/2003 | Trunsky | |
| 6,588,375 B2 | 7/2003 | Benedettini | |
| 6,651,854 B1 * | 11/2003 | LaCoste | 224/196 |
| 6,728,995 B2 | 5/2004 | Ainley et al. | |
| 6,986,325 B1 | 1/2006 | Hsu | |
| 7,063,045 B2 | 6/2006 | Van Meter | |
| 2003/0079695 A1 | 5/2003 | Kerrigan | |
| 2005/0072376 A1 | 4/2005 | Kerrigan | |
| 2005/0263087 A1 * | 12/2005 | Livingston, III | 119/161 |
| 2005/0263098 A1 | 12/2005 | Olson | |
| 2005/0263107 A1 | 12/2005 | Stephanos | |
| 2006/0027187 A1 | 2/2006 | Nicastro | |
| 2006/0113340 A1 * | 6/2006 | Goradesky | 224/269 |
| 2006/0207522 A1 | 9/2006 | Perkitny | |
| 2007/0034166 A1 | 2/2007 | Brooks | |

OTHER PUBLICATIONS

"PCT International Search Report and Written Opinion from International Application No. PCT/US2008/080027, mailed Feb. 19, 2009, pp. 1-10."

\* cited by examiner

*Primary Examiner* — Robert J Sandy
*Assistant Examiner* — Rowland D Do
(74) *Attorney, Agent, or Firm* — Pauly, Devries Smith & Deffner, L.L.C.

(57) ABSTRACT

A device for holding bags containing pet waste is disclosed. In certain embodiments the device comprise a body having a top, a bottom, a first side and a second side; an interior pathway through the body, the interior pathway configured for receiving and retaining a leash; and a latching mechanism configured to secure a bag to the body of the device.

17 Claims, 9 Drawing Sheets

US 8,312,599 B2

APPARATUS FOR RETAINING BAGS FOR CARRYING PET DROPPINGS

FIELD OF THE INVENTION

The present invention is directed to receptacles for retaining bags for carrying pet waste, in particular receptacles for retaining pet waste to a leash.

BACKGROUND

Disposal of pet waste, specifically feces, is a significant problem in many communities. Conscientious owners of dogs, and occasionally owners of cats and other animals, typically take their pets for a walk once or more each day. These walks provide exercise for both the owner and the pet.

Pets will commonly defecate one or more times on such walks, producing droppings of feces along streets, sidewalks, on trails, lawns, etcetera. Owners of the pets are generally expected, either by law or custom, to remove this pet waste from private and public property. Fortunately, in most areas owners of these pets are very respectful of other people and are conscientious about picking up pet waste. Typically owners will carry one or more plastic bags, often recycled from newspaper wrappers or shopping bags, and will place the waste in the plastic bags. If a garbage can is readily accessible, this plastic bag containing the waste will be immediately discarded. Unfortunately, the norm on a walk is often that garbage cans are not immediately available. In such situations, the pet owner will carry the waste-containing bag in their free hand (while the pet is held on a leash with their other hand). In the alternative, sometimes owners will tie the plastic bag containing the waste to the leash. Although a good idea in concept, tying a waste-containing bag to a leash has numerous significant shortcomings. Perhaps the greatest shortcoming is that well-secured bags are often very difficult to untie from the leash. Efforts to untie the bag can often result in tearing holes in the bag or having the bag open up, obviously undesirable. If a pet owner decides to tie the bag more loosely to the leash, thereby allowing it to be untied more easily, a new pitfall arises because the bag then readily slides along the leash, slipping down to the pet, and potentially rupturing or falling off the leash. Thus, whether a person loosely ties a waste-containing bag to a pet leash or tightly ties the waste-containing bag to the leash, significant downsides to such methods are observed.

A number of persons have sought to resolve this issue by making devices that will secure bags to a pet's leash. Unfortunately, most such devices have significant shortcomings, either in how they are secured to the leash, how they hold a bag, how they release the waste-containing bag, etcetera. Therefore, a need exists for an improved device for retaining a bag containing pet waste.

SUMMARY OF THE INVENTION

The present invention is directed to an article for retaining one or more bags that contain pet waste. The present invention overcomes the many obstacles in the art by devising a pet waste carrier that can readily be secured to a pet's leash, securely retains and releases plastic bags containing pet waste without damage to the bags, and holds the waste-containing bags to a convenient, ergo dynamic article that is easy to use. The pet waste carrier can be secured to a leash regardless of whether the leash is circular in cross section or is a wide or narrow strap. Also, the pet waste carrier can be secured to leash handles, belts, and other articles.

One advantage of the present invention is that it allows a bag to be securely retained without being torn, punctured, or shredded. A plastic bag attached to the carrier typically follows a direction-changing path that maximizes holding using a combination of pressure and teeth. In some implementations only teeth are used, but the teeth are configured such that they do not puncture a typical plastic bag used to retain waste. In addition, the present invention allows a user to either tie the bag shut manually with a knot or to simply have the device hold the bag shut under pressure.

Thus, the present invention is advantageous because it does not require a bag to be tied shut before being received by the bag carrier, yet it allows such bags (which have been tied shut) to still be readily used with the device. This improvement offers a number of advantages, including flexibility, depending on personal preferences of whether to tie the bag shut or not, and the ability to leave the bag untied initially but then to tie it later. Leaving the bag initially untied is particularly advantageous in circumstances where a person walking their pet is required to pick up a number of droppings during the walk. If the bag were to be permanently tied after picking up the first droppings, then multiple bags would be required for the walk.

One further advantage of the present invention is that it allows the user to grip the bag holder and leash simultaneously with one hand, and then to load or unload bags easily with the free hand.

Thus, the invention is directed in part to a device for holding bags containing pet waste, the device comprising a body having a top, a bottom, a first side and a second side; an interior pathway through the body, the interior pathway configured for receiving and retaining a leash; and a latching mechanism pivotally mounted on the body, the latching mechanism configured to secure a bag to the body. In certain embodiments, the interior pathway has a length extending from one end of the body to the other end of the body, plus a width and a height; wherein the width of the interior pathway equals at least two times the height. In some implementations the width equals at least three times the height, while in other implementations the width equals at least five times the height.

The device also includes, in certain embodiments, a compressible foam member within the interior of the body, said compressible foam member at least partially obstructing the interior pathway. Typically the compressible foam member is configured to apply a pressure against a leash running through the interior pathway of the device. The device can further comprise at least one protrusion on the interior of the body in contact with the compressible foam member, the protrusion and compressible foam member combining to apply a retaining force to a leash running through the interior pathway of the device. In some embodiments, the body contains at least two protrusions on the interior of the body in contact with the compressible foam member. In yet other implementations the interior has oppositely arranged protrusions that create a tortuous path though which the leash is wrapped. This tortuous path provides increased holding force for retaining the body in a set position on the leash.

Typically the body comprises first and second detachable portions, said first and second detachable portions each defining part of the interior pathway of the device. The device typically also comprises a second latching mechanism configured to secure a bag to the body. The first and second latching mechanisms are generally aligned to retain a leash and a waste-containing bag substantially perpendicular to one another. The second latching mechanism can be constructed, for example, of a pivotable locking door. Generally the pivotable locking door contains a recessed locking latch, said recessed locking latch substantially flush with an exterior surface of the body. Also, the latching mechanism can be configured to receive either a cord or a strap.

This summary of the present invention is merely an overview of some of the teachings of the present application and is not intended to describe each disclosed embodiment or every implementation of the present invention. Further embodiments will be found in the figures, detailed descriptions, and claims. The scope of the present invention should be determined by the appended claims and their legal equivalents.

DRAWINGS

The invention may be more completely understood in connection with the following drawings, in which.

Figure 1:
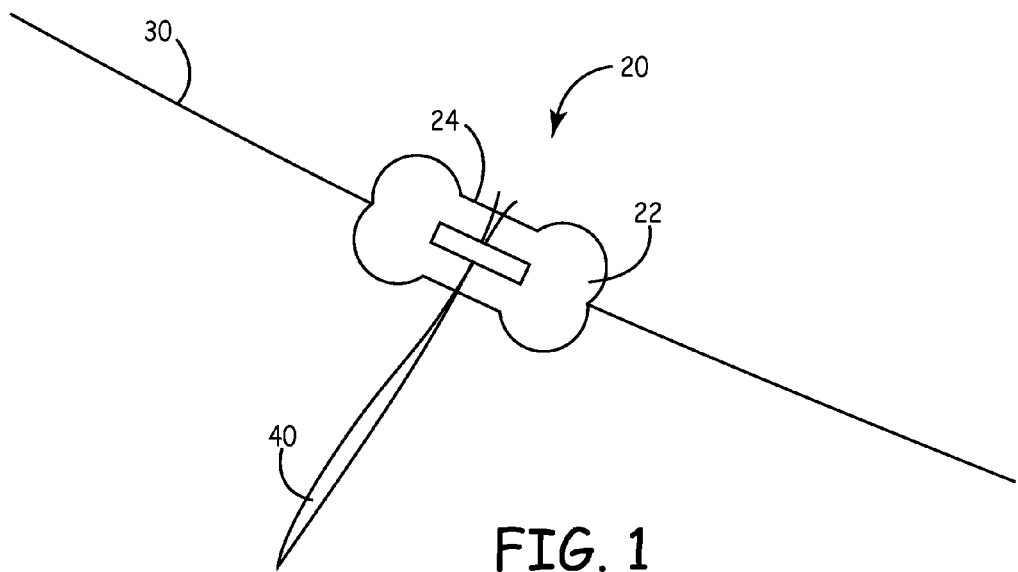
FIG. 1 shows a pet waste carrier device constructed in accordance with an implementation of the invention, the carrier device shown attached to a pet leash (and showing the back of the pet waste carrier device retaining an empty bag).

While the invention is susceptible to various modifications and alternative forms, specifics thereof have been shown by way of example and drawings, and will be described in detail. It should be understood, however, that the invention is not limited to the particular embodiments described. On the contrary, the intention is to cover modifications, equivalents, and alternatives falling within the spirit and scope of the invention.

DETAILED DESCRIPTION

The present invention is directed to a pet waste carrier for retaining one or more plastic bags that contain pet waste, such as droppings from a dog. The present invention overcomes the many obstacles in the art by devising a pet waste carrier that is attractive, easy to use, and highly functional. The carrier can readily be secured to a pet's leash, securely retain and release plastic bags containing pet waste without damage to the bags, can hold bags that have or have not been knotted shut, hold the bags without readily sliding up and down a leash, and hold the waste-containing bags in a convenient, ergo dynamic carrier that is easy to use. Also, one advantage of the invention is that the pet waste carrier can be secured to a leash regardless of whether the leash is circular in cross section or is a strap that is much wider than it is thick. Also, the pet waste carrier can be secured to leash handles, belts, and other articles.

A plastic bag attached to the carrier typically follows a direction-changing path that maximizes holding using a combination of pressure and teeth. This design is useful because the curving path of the bag, along with the optional use of teeth, hold bags of various thicknesses and dimensions securely. As noted above, an advantage of the present invention is that it allows a waste-containing bag to be securely retained without being torn or shredded.

In addition, the carrier allows a user to either tie the bag shut manually with a knot or to simply have the device hold the bag shut under pressure. Optionally, when more than one bag is retained, some can be knotted shut and some can be left open. Notably, empty bags can be held in the carrier until they are needed, without damage to the bag and without requiring the hassle of tying and untying empty bags to a leash, only to have the bags needing to be retired to the leash again after being used and untied again to be disposed.

Thus, the present invention is advantageous because it does not require a bag to be tied shut before being received by the bag carrier, yet it allows such bags (which have been tied shut) to still be readily used with the device. This improvement offers a number of advantages, including flexibility, depending on personal preferences of whether to tie the bag shut or not, and the ability to leave the bag untied initially but then to tie it later. Leaving the bag initially untied is particularly advantageous in circumstances where a person walking their pet is required to pick up a number of droppings during the walk. If the bag were to be permanently tied after picking up the first droppings, then multiple bags would be required for the walk. One further advantage of the present invention is that it allows the user to grip the bag holder and leash simultaneously with one hand, and then to load or unload bags easily with the free hand.

Thus, the invention is directed in part to a device for holding bags containing pet waste, the device comprising a body having a top, a bottom, a first side and a second side; an interior pathway through the body, the interior pathway configured for receiving and retaining a leash; and a latching mechanism pivotally mounted on the body, the latching mechanism configured to secure a bag to the body. In certain embodiments the interior pathway has a length extending from one end of the body to the other end of the body, plus a width and a height; wherein the width of the interior pathway equals at least two times the height. In some implementations the width equals at least three times the height, while in other implementations the width equals at least five times the height.

The device also includes, in certain embodiments a compressible foam member within the interior of the body, said compressible foam member at least partially obstructing the interior pathway. Typically the compressible foam member is configured to apply a pressure against a leash running through the interior pathway of the device. The device can further comprise at least one protrusion on the interior of the body in contact with the compressible foam member, the protrusion and compressible foam member combining to apply a retaining force to a leash running through the interior pathway of the device. In some embodiments, the body contains at least two protrusions on the interior of the body in contact with the compressible foam member. Such protrusions can form a tortuous path for holding the device on the leash, with or without use of a foam piece.

Typically the body comprises first and second detachable portions, said first and second detachable portions each defining part of the interior pathway of the device. The device typically also comprises a second latching mechanism configured to secure a bag to the body. The first and second latching mechanisms are generally aligned to retain a leash and a waste-containing bag substantially perpendicular to one another. The second latching mechanism can be constructed, for example, of a pivotable locking door. Generally the pivotable locking door contains a recessed locking latch, said recessed locking latch substantially flush with an exterior surface of the body. Also, the latching mechanism can be configured to receive either a cord or a strap.

Figure 2:
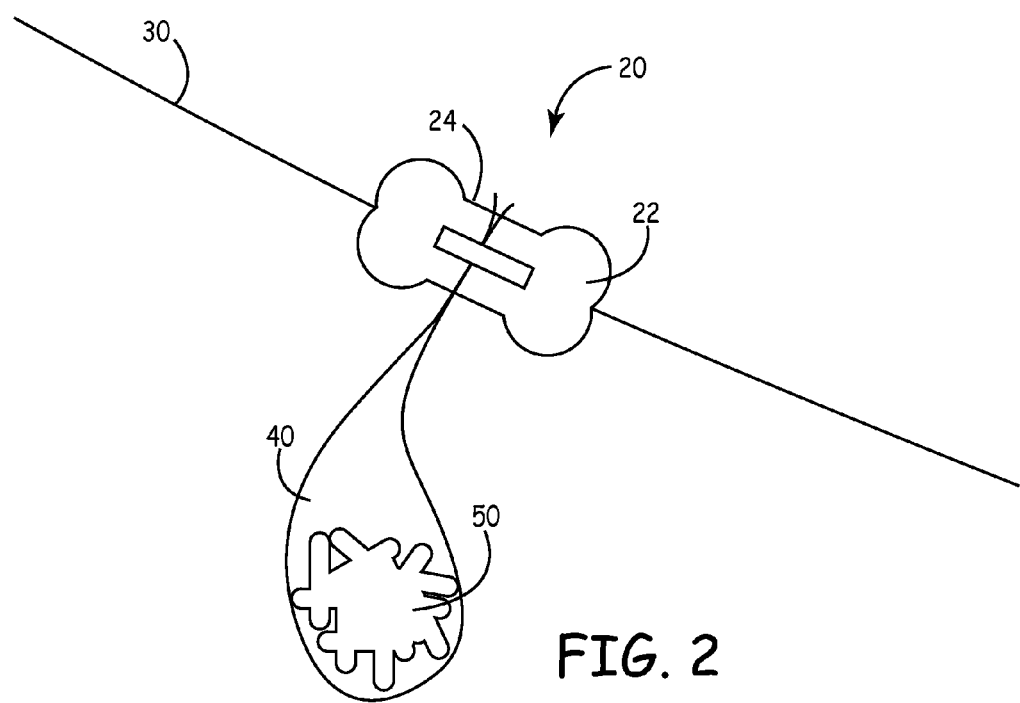
FIG. 2 shows a pet waste carrier device constructed in accordance with an implementation of the invention, the carrier device shown attached to a pet leash with a bag containing pet waste retained by the carrier device (showing the back of the pet waste carrier device).

The invention will now be more thoroughly understood by reference to the figures. Attention is first called to FIG. 1, which shows a pet waste carrier device 20 constructed in accordance with an implementation of the invention, the carrier device 20 shown attached to a pet leash 30 with the back of the carrier device 20 exposed. The carrier device 20 is holding empty bag 40. FIG. 2 shows the same pet waste carrier device 20, but in addition the bag 40 has been filled with pet waste 50. The carrier device 20 as depicted in the embodiment shown in FIG. 1 is secured along the leash 30 such that the leash 30 runs through an interior opening (not shown) in the carrier device 20. Also, it will be observed in the present embodiment that the carrier device 20 is wider at its ends 22 than at its center 24. This has the advantage that the carrier device 20 is easier to hold and grip, especially when the leash 30 is being actively pulled.

Typically a user's free hand will be holding the leash 30, but in some embodiments the leash 30 will be temporarily held by holding onto the carrier device 20 across its center 24, so that the user can use their other hand to remove a bag 40, fill it with waste 50 and reattach the filled bag to the carrier device 20. Thus, the present invention typically can be retained around a leash 30 with sufficient strength so as to allow the leash 30 to be temporarily held just by holding the carrier device 20.

Figure 3A:
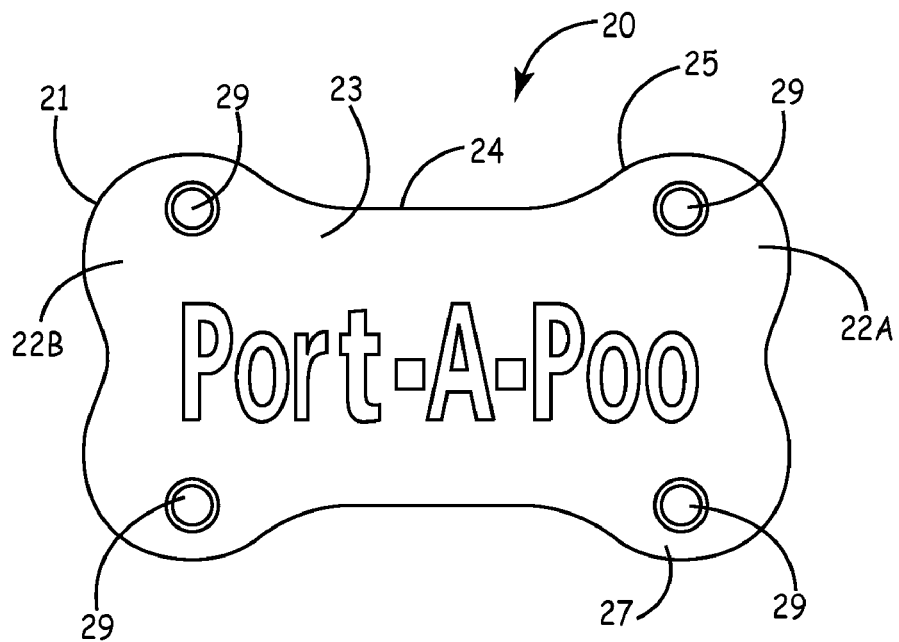
FIG. 3A shows a front plan view of a pet waste carrier device constructed in accordance with first implementation of the invention.
Figure 3B:
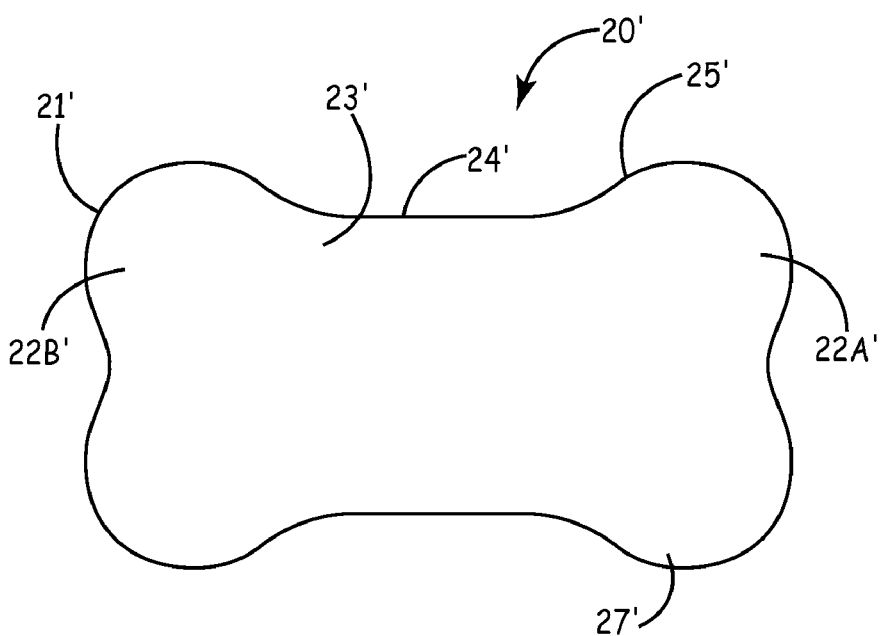
FIG. 3B shows a front plan view of a pet waste carrier device constructed in accordance with a second implementation of the invention.

Reference will now be made to a series of other figures. FIG. 3A shows a front view of a pet waste carrier device 20 constructed in accordance with an implementation of the invention, and FIG. 3B shows an alternative design for a pet waste carrier device 20' constructed in accordance with an alternative embodiment. One primary difference between carrier devices 20 and 20' is that in the first implementation screws are shown in the front surface, while in the second implementation screws are not present in the front surface.

Figure 4:
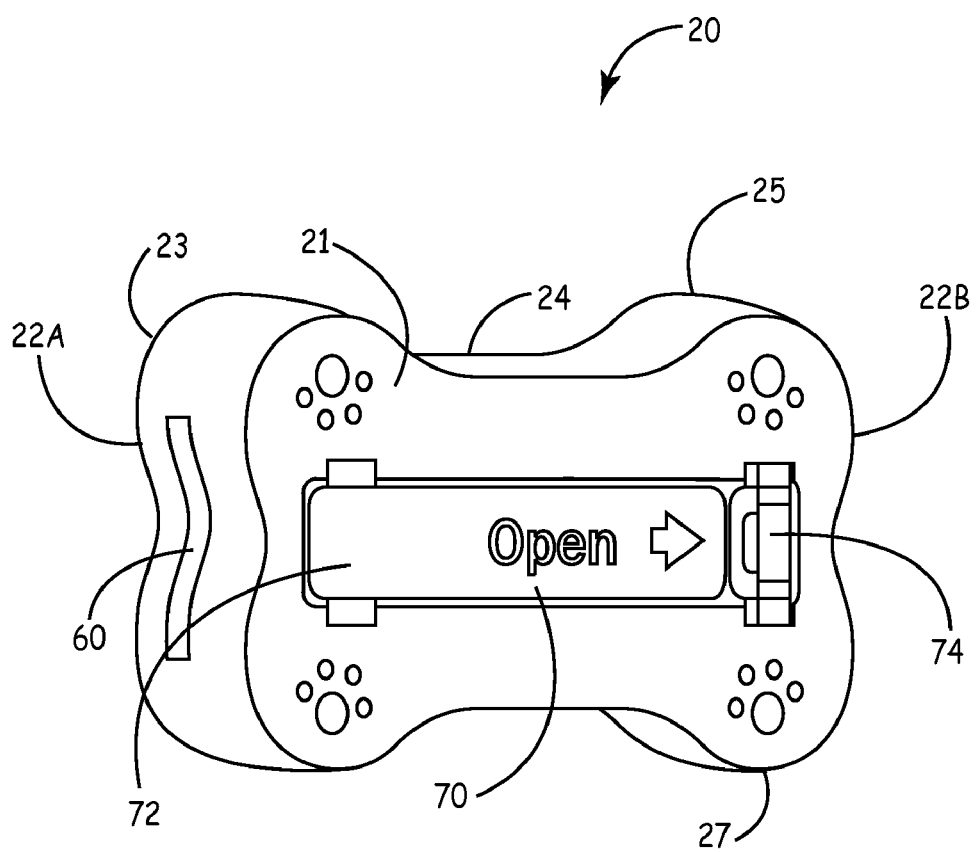
FIG. 4 shows a rear perspective view of a pet waste carrier device constructed in accordance with an implementation of the invention.
Figure 5:
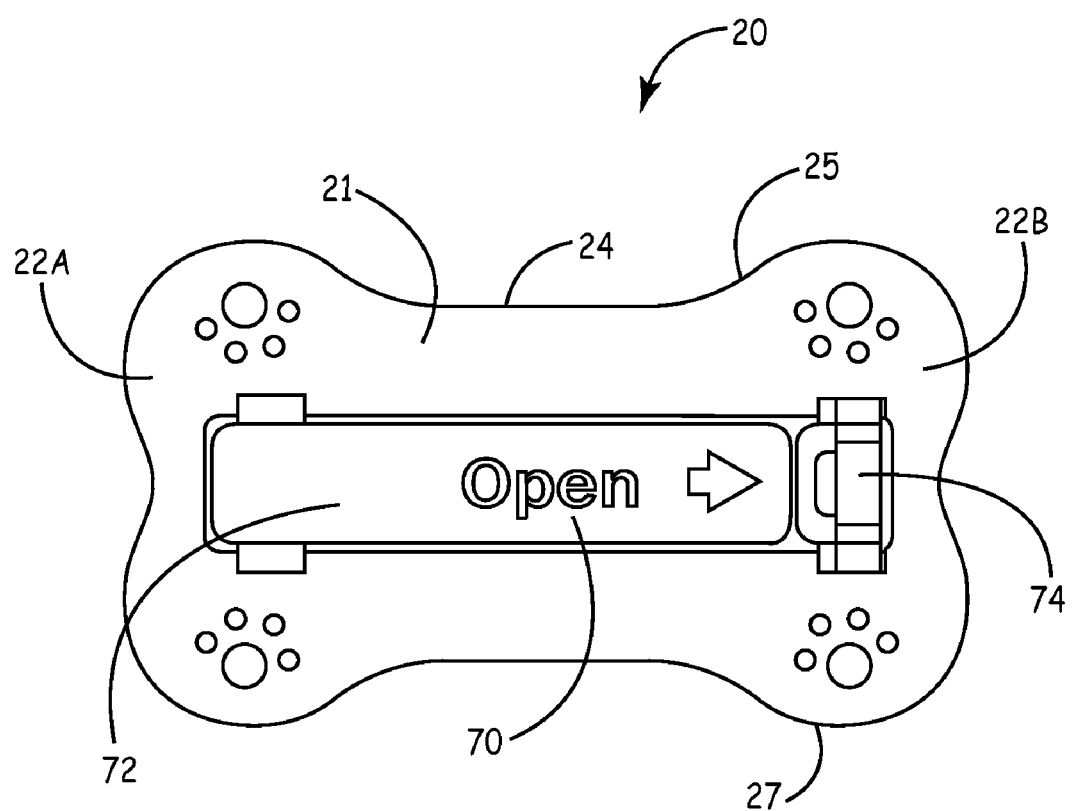
FIG. 5 shows a rear plan view of a pet waste carrier device constructed in accordance with an implementation of the invention.
Figure 6:
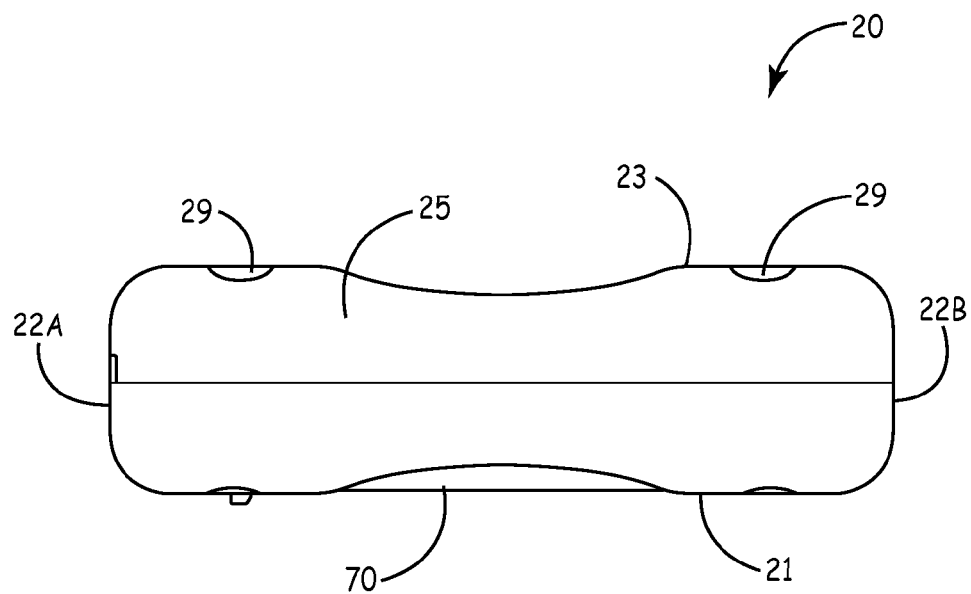
FIG. 6 shows a top plan view of a pet waste carrier device constructed in accordance with an implementation of the invention.
Figure 7:
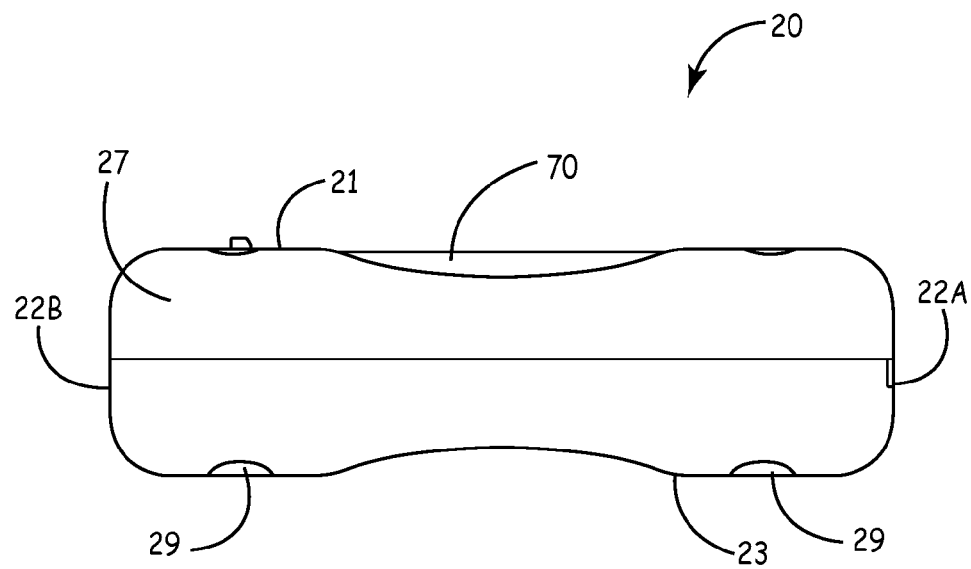
FIG. 7 shows a bottom plan view of a pet waste carrier device constructed in accordance with an implementation of the invention.
Figure 8:
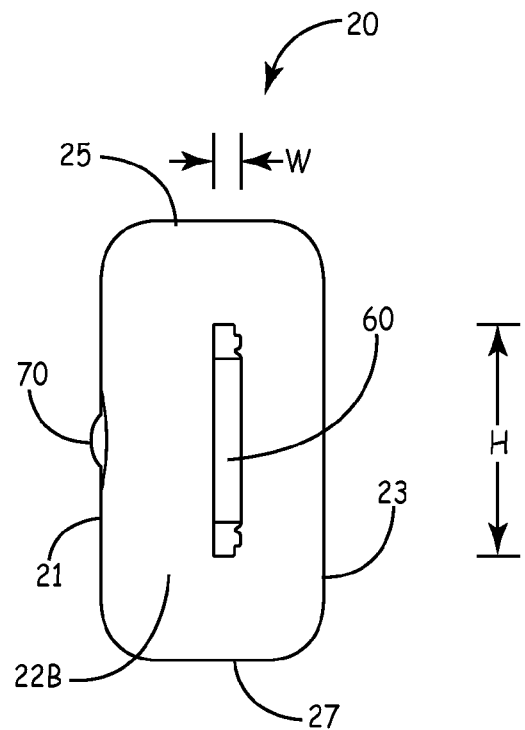
FIG. 8 shows a first side plan view of a pet waste carrier device constructed in accordance with an implementation of the invention.
Figure 9:
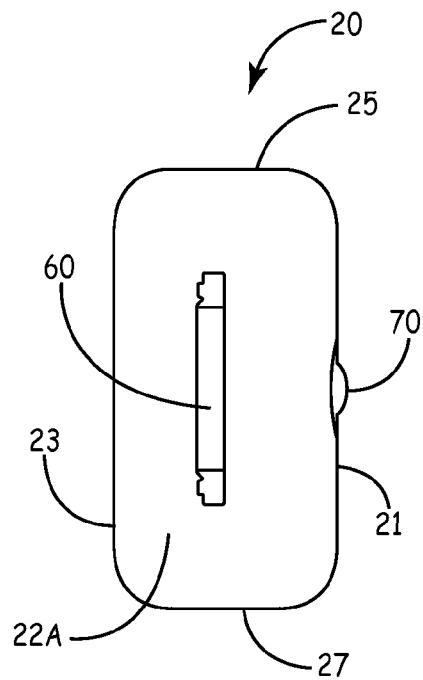
FIG. 9 shows a second side view of a pet waste carrier device constructed in accordance with an implementation of the invention.

FIG. 4 shows a rear perspective view of the pet waste carrier device 20, FIG. 5 shows a rear plan view of the pet waste carrier device 20, FIG. 6 shows a top plan view of the pet waste carrier device 20, FIG. 7 shows a bottom plan view of the pet waste carrier device, FIG. 8 shows a first side plan view of the pet waste carrier device 20, and FIG. 9 shows a second side view of the pet waste carrier device 20.

The pet carrier device 20 includes ends 22A and 22B and central portion 24. Top 25, bottom 27, back 21, and front 23 further define the carrier device 20. In the embodiment depicted, the ends 22A and 22B are wider than the central portion 24 of the carrier device 20. This allows a hand to be wrapped around the device 20 and hold it more securely. It also offers the advantage that it provides an attractive appearance, much like a pet bone, fire hydrant, dog house, etc.

In the alternative carrier device 20' shown in FIG. 3B, the pet carrier device 20' includes ends 22A' and 22B' and central portion 24'. Top 25', bottom 27', back 21', and front 23' further define the carrier device 20'. In the embodiment depicted, the ends 22A' and 22B' are wider than the central portion 24' of the carrier device 20'. This allows a hand to be wrapped around the device 20' and hold it more securely. It also offers the advantage that it provides an attractive appearance, much like a pet bone. The alternative carrier device 20' does not contain any screw holes in the front 23', although it typically will include a logo or name, such as "Port-A-Poo" (not shown in FIG. 3B).

Referring further to the device of FIG. 3A, the device 20 is traversed by a channel 60 extending from first end 22A to second end 22B. This channel is configured to have a length from end 22A to 22B, plus a width and a height, the height being greater than the width. Thus, as shown in FIG. 8, for example, the height is represented by the dimension "H" and the width is represented by the dimension "W". Channel 60 is configured to hold a leash in place by passing the leash through the channel from ends 22A to 22B. Typically this is done by opening two halves of the device 20 and snapping them back together (or otherwise affixing them) onto the leash. The channel 60 readily accommodates flat leashes and straps attached to leash holders, as well as round leashes.

Referring again to FIG. 3 as well as FIG. 4, the back of the carrier device 20 includes a bag retainer 70 designed to securely pivot around joint 72 and to lock at latch 74. The bag retainer 70 opens and closes, pivoting along joint 72, to release or grasp one or more bags (not shown). FIGS. 5 to 9 show other sides of the device, clarifying the position of the channel and also showing fasteners 29 configured to secure pieces of the body together. Suitable fasteners include, for example, screws.

Thus, the channel 60 secures the carrier device 20 to a leash, and the bag retainer 70 secures bags, with or without waste, to the device 20. In this way plastic bags are securely held to the leash. As will be observed from the figures, the carrier device 20 typically is secured to the leash in such a manner that the axis along the length of a bag secured in the carrier device 20 is substantially perpendicular to the axis of the leash. In this manner the bag is kept as far from the leash as possible, which has a number of benefits, including avoiding having the bag wrap around the leash, avoiding having the bag rub against the leash and develop a hole, avoid having the bag come in contact with the pet, and allowing the greatest freedom in securing the bag without obstruction from the leash.

Figure 10:
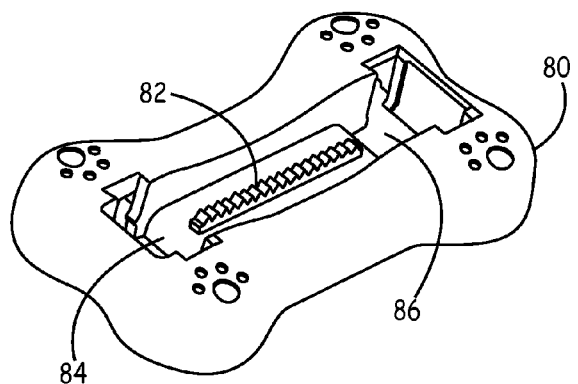
FIG. 10 shows a perspective exterior view of a rear section of a pet waste carrier device constructed in accordance with an implementation of the invention.
Figure 11:
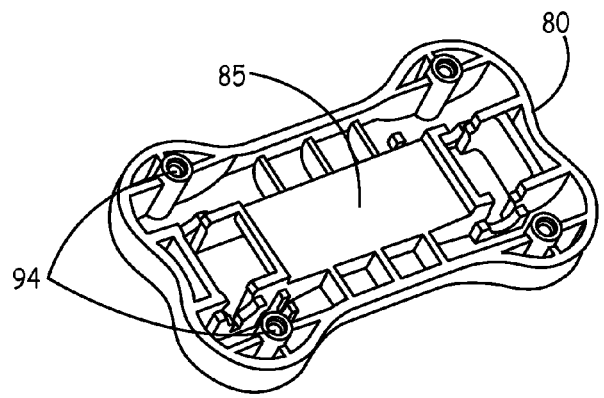
FIG. 11 shows a perspective interior view of a rear section of a pet waste carrier device constructed in accordance with an implementation of the invention.
Figure 12:
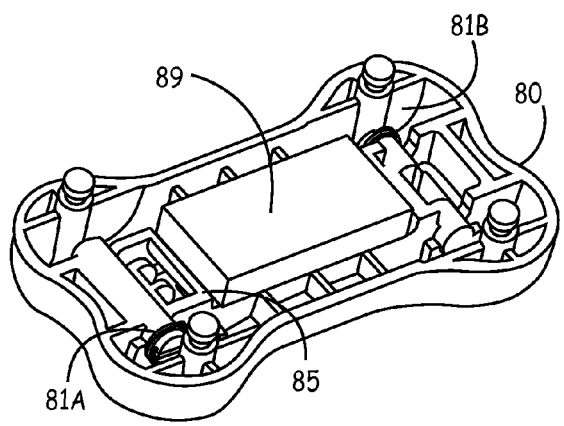
FIG. 12 shows a perspective interior view of a rear section of a pet waste carrier device constructed in accordance with an implementation of the invention, showing the front section with a foam retainer installed.

FIG. 10 shows a perspective exterior view of a back section 80 of a pet waste carrier device constructed in accordance with an implementation of the invention. The back section 80 includes a recess into which the bag retainer 70 (not shown) resides, including a recessed joint area 84 for the pivot and a recessed locking area 86 for the latch. The recess includes a plurality of teeth 82 configured to engage the back of the bag retainer 70 without tearing or otherwise damaging a bag held within the device. The front side of the back section 80 is shown in perspective view in FIG. 11. The front side includes, in the embodiment shown, a foam receiving area 85. This foam receiving area 85 is shown in FIG. 12 with a piece of foam 89 in place. FIG. 12 also shows a plurality of screws 87, and two springs 81A and 81B used to respectively spring load the latch and retainer.

Figure 13:
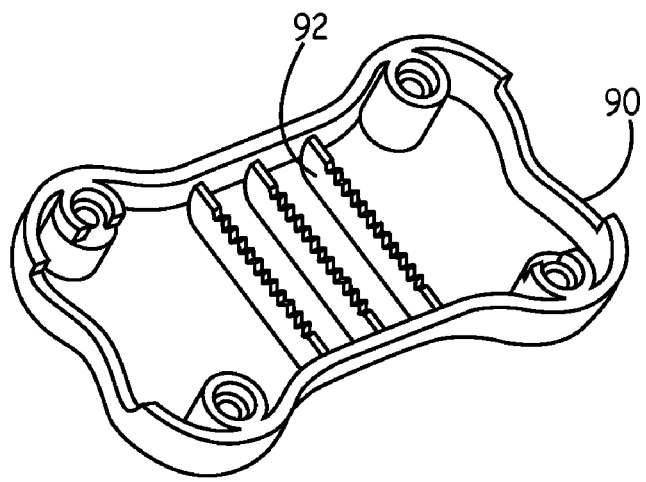
FIG. 13 shows a perspective interior view of a front section of a pet waste carrier device constructed in accordance with an implementation of the invention.
Figure 14:
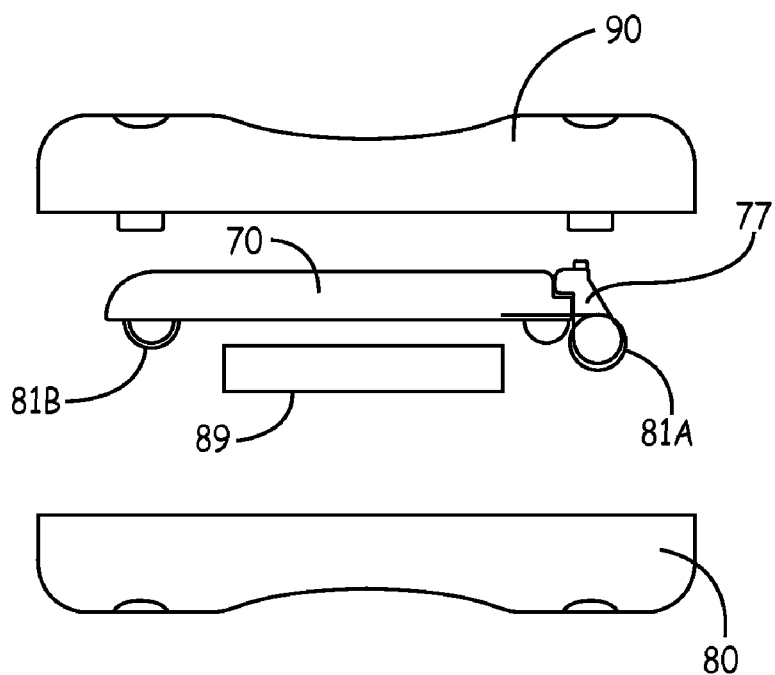
FIG. 14 shows an exploded view of a pet waste carrier device constructed in accordance with an implementation of the invention.
Figure 15:
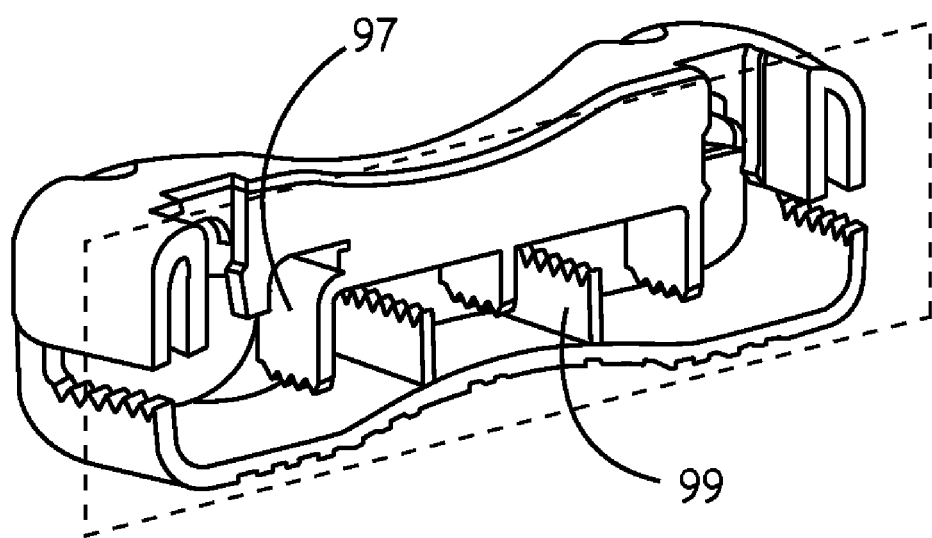
FIG. 15 shows an alternative interior view of a pet waste carrier device constructed in accordance with an implementation of the invention.

FIG. 13 shows a perspective interior view of a front section 90 of a pet waste carrier device constructed in accordance with an implementation of the invention, including a plurality of teeth 92 in three rows, the plurality of teeth 92 configured to press against the piece of foam 89 in the rear section 80. In this manner a leash is held in place between the rear and front sections 80, 90 by pressure formed between the teeth 92 and the foam 89. FIG. 14 shows an exploded view of a pet waste carrier device constructed in accordance with an implementation of the invention, showing rear section 80, rear section 90, bag retainer 70, latch 77, springs 81A and 81B, and foam 89. An alternative embodiment is shown in cross section in FIG. 15, which depicts teeth 97, 99 on opposite sides of the interior channel of the carrier device, the teeth combining to create a tortuous path well suited to securely holding a device in place along a leash.

This application is intended to cover adaptations or variations of the present subject matter. It is to be understood that the above description is intended to be illustrative, and not restrictive. The scope of the present subject matter should be determined with reference to the appended claims, along with the full scope of equivalents to which such claims are entitled.

We claim:

1. A device for holding bags containing pet waste, the device comprising:
   a front portion and a rear portion, wherein the front portion contains a front surface and an opposed back surface, and wherein the opposed back surface of the front portion is releasably secured to the rear portion of the device;
   an interior pathway through the device, the interior pathway formed between the back surface of the front portion and the rear portions of the device, the interior pathway retaining a leash, the leash retained by applying pressure between the front and the rear portions of the device and against the leash, the interior pathway defining a first axis running from a first end to a second end of the device; and
   a latching mechanism pivotally mounted to the front surface of the front portion of the device, the latching mechanism comprising a pivotable locking door securing the top of a bag to the front surface of the front portion of the device such that the bag is retained substantially perpendicular to the first axis running from the first end to the second end of the device;
   wherein the latching mechanism pivotally mounted to the front portion of the device can be opened without separating the front portion and the rear portion of the device.

2. The device for holding bags containing pet waste of claim 1,
   the interior pathway having a length extending from one end of the device to the other end of the device, plus a width and a height; and
   wherein the width of the interior pathway equals at least two times the height.

3. The device for holding bags containing pet waste of claim 1,
   the interior pathway having a length extending from one end of the device to the other end of the device, plus a width and a height; and
   wherein the width equals at least three times the height.

4. The device for holding bags containing pet waste of claim 1,
   the interior pathway having a length extending from one end of the device to the other end of the device, plus a width and a height; and
   wherein the width equals at least five times the height.

5. The device for holding bags containing pet waste of claim 1, further comprising:
   a compressible foam member within the interior of the device, said compressible foam member at least partially obstructing the interior pathway;
   wherein the compressible foam member is applies pressure against a leash running through the interior pathway of the device.

6. The device for holding bags containing pet waste of claim 5, further comprising at least one protrusion on the interior of the device in contact with the compressible foam member, the protrusion and compressible foam member combining to apply a retaining force to a leash running through the interior pathway of the device.

7. The device for holding bags containing pet waste of claim 5, wherein the device contains at least two protrusions on the interior of the body in contact with the compressible foam member.

8. The device for holding bags containing pet waste of claim 1, wherein the pivotable locking door contains a recessed locking latch, said recessed locking latch substantially flush with an exterior surface of the device.

9. The device for holding bags containing pet waste of claim 1, wherein the latching mechanism retains either a cord or a strap.

10. A device for holding bags containing pet waste, the device comprising:
    a first portion and a second portion, wherein the first portion and the second portion are releasably secured to one another;
    an interior pathway through the device, the interior pathway formed between the first and second portions of the device, the interior pathway retaining a leash, and the interior pathway having a length extending from one end of the device to the other end of the device, plus a width and a height wherein the width equals at least three times the height;
    a locking door pivotally mounted on a front surface of the first portion of the device, a latching mechanism securing the top of a bag to the first portion of the device; and
    a compressible foam member within the interior of the device, said compressible foam member at least partially obstructing the interior pathway;
    wherein the compressible foam member applies pressure against a leash running through the interior pathway of the device; and the interior pathway and the latching mechanism retaining the leash substantially perpendicular to the top of the bag held by the latching mechanism.

11. The device for holding bags containing pet waste of claim 10,
wherein the width of the interior pathway equals at least five times the height of the interior pathway.

12. The device for holding bags containing pet waste of claim 10, further comprising at least one protrusion on the interior of the device in contact with the compressible foam member, the protrusion and compressible foam member combining to apply a retaining force to a leash running through the interior pathway of the device.

13. The device for holding bags containing pet waste of claim 10, wherein the device comprises first and second detachable portions, said first and second detachable portions each defining part of the interior pathway of the device.

14. An apparatus for containing pet waste, the apparatus comprising:
a front portion and a rear portion, wherein the front portion and the rear portion are
releasably secured to one another;
an interior pathway through the apparatus, the interior pathway formed between the front and rear portions of the apparatus, the interior pathway receiving and retaining a leash,
the leash retained within the interior pathway by pressure applied between the front and rear portions of the apparatus and against the leash; and
a latching mechanism pivotally mounted to the front portion of the apparatus, the latching mechanism comprising a pivotable locking door securing the top of a bag to the apparatus.

15. The apparatus of claim 14, the interior pathway having a length extending from one end of the apparatus to the other end of the apparatus, plus a width and a height; and
wherein the width of the interior pathway equals at least two times the height.

16. The apparatus of claim 15, further comprising at least one protrusion on the interior pathway in contact with a compressible foam member, the protrusion and the compressible foam member combining to apply a retaining force to the leash running through the interior pathway of the apparatus.

17. The apparatus of claim 15, wherein the pivotable locking door contains a recessed locking latch, said recessed locking latch substantially flush with an exterior surface of the apparatus.

* * * * *